Figure 1:
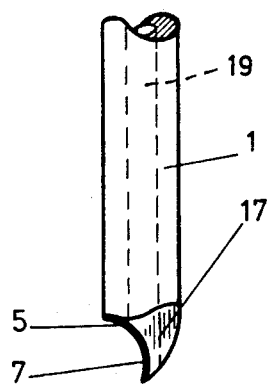

United States Patent [19]
Hofmann

[11] 4,051,596
[45] Oct. 4, 1977

[54] WIRE CUTTER, PARTICULARLY FOR CUTTING ELECTRICAL CONNECTION WIRES

[75] Inventor: Heinrich Hofmann, Biebertal, Germany

[73] Assignee: U.S. Philips Corporation, New York, N.Y.

[21] Appl. No.: 719,987

[22] Filed: Sept. 2, 1976

[30] Foreign Application Priority Data
Sept. 10, 1975 Germany .............................. 2540299

[51] Int. Cl.² ............................................. B23D 29/02
[52] U.S. Cl. .......................................... 30/133; 30/240
[58] Field of Search ...................... 30/29.5, 133, 240; 128/276, 305

[56] References Cited
U.S. PATENT DOCUMENTS

| | | | |
|---|---|---|---|
| 1,493,240 | 5/1924 | Bohn | 128/305 |
| 1,860,409 | 5/1932 | Flink | 30/29.5 |
| 2,387,633 | 10/1945 | Alpert | 30/240 |
| 2,767,468 | 10/1956 | Rogal | 30/240 |
| 2,894,324 | 7/1959 | Hardin | 30/240 |
| 2,951,288 | 9/1960 | Holmes | 30/240 |
| 3,699,652 | 10/1972 | Deverman | 30/29.5 |
| 3,732,858 | 5/1973 | Banko | 128/276 |

Primary Examiner—Jimmy C. Peters
Attorney, Agent, or Firm—Frank R. Trifari; David R. Treacy

[57] ABSTRACT

A wire cutter, particularly for cutting electrical connection wires, comprising a hollow shaft rotatably guided in a sleeve. Respective ends of the sleeve and the shaft have end faces with cutting edges which extend partially parallel to the rotation axis.

3 Claims, 3 Drawing Figures

WIRE CUTTER, PARTICULARLY FOR CUTTING ELECTRICAL CONNECTION WIRES

The invention relates to a wire cutter, particular for cutting electrical connection wires.

Ends of electrical connection wires which project from soldered joints are removed by means of side cutters in development and manufacturing shops. Side cutters operate according to the compression principle. A frequent problem is that the removed wire ends fly off in all directions in an uncontrolled manner. Such flying wire ends cause numerous short-circuits in manufacturing shops, inter alia on printed wiring boards.

The invention has for its object to provide a wire cutter by means of which connection wire ends can be removed without the wire ends flying off in an uncontrolled manner.

This object is acheived by a wire cutter in accordance with the invention which comprises a shaft which is guided in a sleeve and which is rotatable with respect thereto, the sleeve and the shaft being provided on neighbouring end faces with cutting edges which extend substantially axially and which cooperate in a cutting manner, the shaft being hollow and connected to a suction device.

When the sleeve and the shaft of this wire cutter are rotated relative to each other, a cutting action occurs between the cutting edges and the piece of wire inserted between the cutting edges is cut off. The wire end cannot fly off in an uncontrolled manner in this case. Moreover, it has been found that comparatively thick wires can be readily cut by means of the wire cutter in accordance with the invention.

Generally speaking, the advantages of the present wire cutter are embodied in longer cutting service lifes and in the possibility of manufacturing very small cutters by means of which cutting operations can also be performed in complex circuits (computers).

In order to remove very efficiently, the cut-off wire ends a hole is provided in the shaft and this hole is connected to a suction device which sucks the wire ends immediately out of the interior of the shaft.

Connection wires are to be understood to mean herein homogeneous wires as well as litz wires which consist of a large number of thin wires. The wire cutter in accordance with the invention produces a perfect cut for both types of connection wires, as opposed to the side cutters which cut litz wires very poorly because of a tendency to squeeze strands away from the cutting edges.

The invention will be described in detail hereinafter with reference to the drawing.

Figure 2:
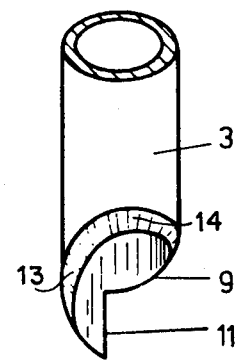
Figure 3:
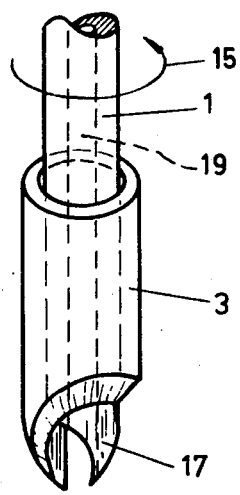

FIGS. 1 and 2 show the essential parts of the wire cutter in the disassembled condition, and FIG. 3 shows these parts in the assembled condition.

The two parts of the wire cutter which cooperate in a cutting manner are formed by a shaft 1 as shown in FIG. 1 and a sleeve 3 as shown in FIG. 2. which, as is shown in FIG. 3, can be inserted one into the other. One end face 5 of the shaft 1 comprises a cutting edge 7 which is initially arched but which subsequently extends parallel to the shaft axis beyond the end face 5. As shown in FIGS. 1 and 3, a portion of the cutting edge 7 at the distal tip of the sleeve may extend slightly circumferentially in a hook shape in the direction of the arch. The end face 9 of the sleeve 3 also comprises a cutting edge 11 which extends parallel to the sleeve axis beyond the end face 9. Further, a sleeve surface 13, as shown most clearly in FIG. 2, connects the end face 9 to the tip of the cutting edge 11, the surface 13 extending helically away from the tip to a location 14 approximately diametrically opposite the edge 11 but more remote from the tip than the end face 9, and then continues in a reversed helical direction to the end face.

When the shaft 1 and the sleeve 3 are assembled as shown in FIG. 3, the cutting edges 7 and 11 will be adjacently arranged. Obviously, the cutting edges 7 and 11 are shaped and arranged so that they can cooperate in a cutting manner when assembled as shown in FIG. 3. When a connection wire is positioned between the cutting edges 7 and 11, it can be cut when, for example, the shaft 1 is rotated relative to the sleeve 3 in the direction of the arrow 15. By suitable shaping of the face 17 of the shaft, situated behind the cutting face 7, it can be ensured that a wire portion to be cut is held initially inside the space between the shaft 1 and the sleeve 3. The shaft 1 is provided with a bore 19 which is connected to a suction device (not shown in the drawing). The cut-off wire portions are mediately sucked off through the bore 19.

The wire cutter is driven either pneumatically or by means of a system of levers which may be accommodated in a pistol-like grip and which can be operated, for example, by means of the ring finger or an other finger. The operation of the wire cutter is extremely fast and reliable.

What is claimed is:

1. A wire cutter especially adapted for cutting stranded wires comprising a circular cylindrical outer sleeve having an end face and a cutting edge extending parallel to the sleeve axis beyond the end face, a distal tip of the cutting edge being connected to the end face by a surface extending generally helically away from the cutting edge; and a hollow cutting shaft arranged coaxially within said sleeve for rotation relative thereto and having a cutting edge extending to a distal tip at an axial location corresponding to said sleeve tip, said cutting edge extending parallel to the shaft axis at a region adjacent the shaft tip, said shaft cutting edge extending away from said tip and said region along an arch, adjacent said cutting edge said shaft having an end face so shaped that a wire portion to be cut is held inside a space between the shaft and sleeve, whereby rotation of the shaft relative to the sleeve for operative cutting engagement of said cutting surfaces against stranded wire cuts all strands of the wire, while application of suction through said hollow shaft will remove cut wire ends.

2. A wire cutter as claimed in claim 1 wherein said sleeve surface extends generally helically away from the cutting edge to a location approximately diametrically opposite the cutting edge and more remote from the tip than said end face, and continues in a reversed helical direction to said face.

3. A wire cutter as claimed in claim 1 wherein said shaft cutting edge extends, at the shaft tip, in a circumferential hook in the direction of the arch.

* * * * *